June 22, 1954    A. J. SCHUELER    2,681,740
HAND TRUCK FOR MOVING TABLES
Filed Jan. 11, 1952    2 Sheets-Sheet 1

INVENTOR
Alois J. Schueler

BY
McMorrow, Berman & Davidson
ATTORNEYS

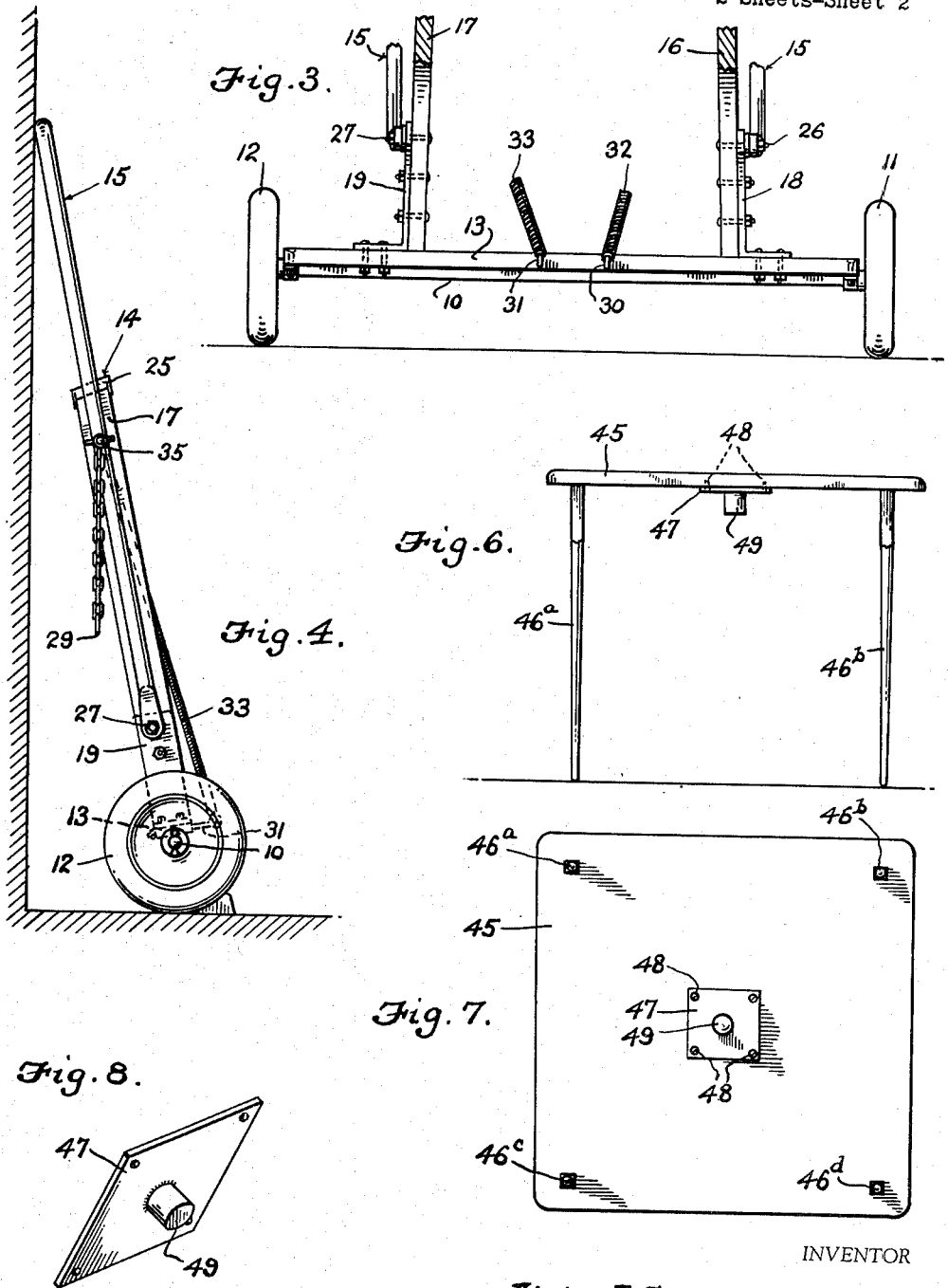

Patented June 22, 1954

2,681,740

UNITED STATES PATENT OFFICE 2,681,740

HAND TRUCK FOR MOVING TABLES

Alois J. Schueler, Hays, Kans.

Application January 11, 1952, Serial No. 265,939

2 Claims. (Cl. 214—370)

This invention relates to hand trucks and more particularly to a hand truck for moving tables in restaurants and similar establishments where a number of tables have to be moved periodically.

It is among the objects of the invention to provide an improved hand truck which is particularly arranged for lifting and moving restaurant tables and similar objects; which enables one person to easily move heavy restaurant tables without dragging the tables on the floor; which is foldable to a compact condition for storage; and which is simple and durable in construction, economical to manufacture, easy to use, and positive and effective in use.

Other objects and advantages will become apparent from a consideration of the following description and appended claims in conjunction with the accompanying drawings, wherein:

Figure 3 is a fragmentary front elevational view of the truck;

Figure 4 is a side elevational view of the truck in folded condition;

Figure 6 is a side elevational view of a different form of restaurant table with a truck piloting device secured to the table top at the under side of the top;

Figure 7 is a bottom plan view of the table illustrated in Figure 6; and

Figure 8 is a perspective view of the truck piloting device mounted on the table in Figures 6 and 7.

Figure 1:
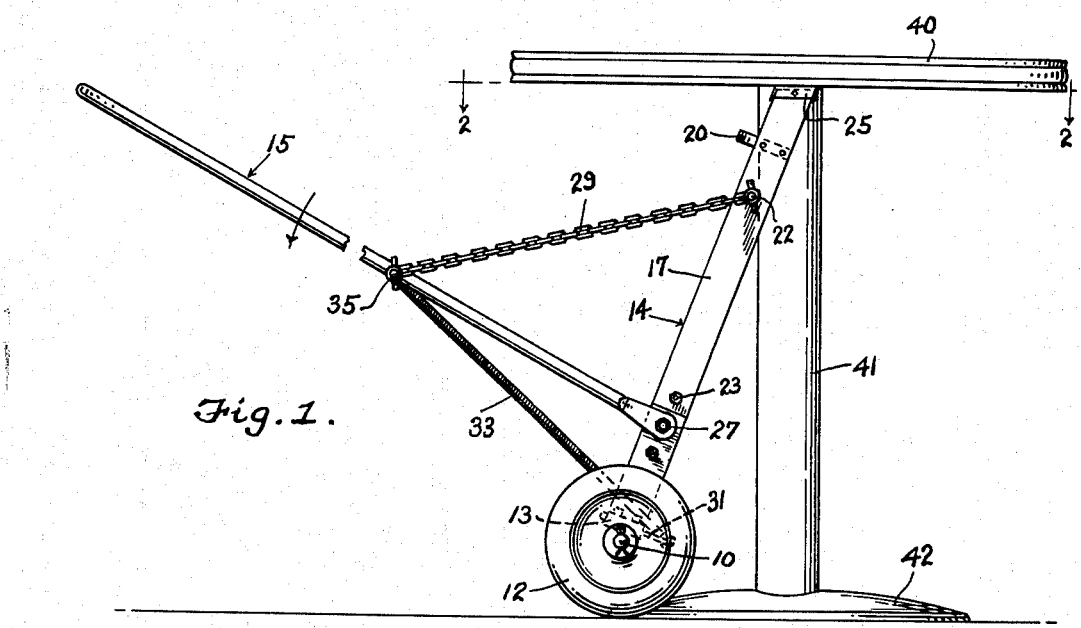
Figure 1 is a side elevational view of a hand truck illustrative of the invention and a restaurant table supported thereby.

With continued reference to the drawings, the hand truck comprises an axle 10, wheels 11 and 12 journaled on the axle one at each end of the latter, the wheels being rubber tired wheels of a type normally used to support hand trucks, a flat base 13 secured to the axle 10 and extending along the axle between the wheels 11 and 12, a frame, generally indicated at 14, secured at one end to the base and projecting substantially perpendicularly from the latter and a U-shaped handle, generally indicated at 15, pivotally connected at its ends to the frame 14.

The frame 14 comprises bars 16 and 17 of elongated, rectangular cross sectional shape secured each at one end to the base 12 at spaced apart locations along the latter by the angle brackets 18 and 19 respectively, and converging slightly toward each other in a direction away from the base. The bars 16 and 17 are of substantially the same length and have their longitudinal center lines substantially in a common plane which also includes the longitudinal center line of the base 13.

Figure 5:
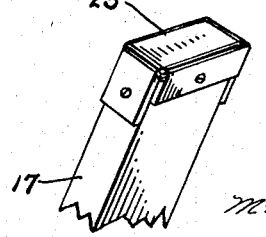
Figure 5 is a perspective view of a fragmentary portion of the truck showing a structural detail thereof.

A cross member 20 of elongated, rectangular shape extends between and is connected at its ends to the bars 16 and 17 near the ends of the bars remote from the base 13, this cross member having its wider surfaces substantially perpendicular to the longitudinal center lines of the bars 16 and 17 and having in one edge a curved notch 21. Crossed braces 22 and 23 extend between and are connected at their ends to the bars 16 and 17 in the space between the cross member 20 and the base 13. At their ends remote from the base 13 the bars are provided with sheet metal shoes 24 and 25 respectively, as particularly illustrated in Figure 5, to provide a wearing surface on the ends of the bars for engagement against the under surfaces of table tops.

The handle 13 comprises a length of suitable tubing bent to U-shape and having flattened and apertured end portions. The ends of the handle are disposed at the outer sides of the bars 16 and 17 and pivotally connected to the bars by connecting bolts 26 and 27 respectively, at locations adjacent the space 13 but somewhat spaced from the base.

Flexible members, such as the chains 28 and 29 are connected one between each of the bars 16 and 17 and the corresponding sides or legs of the handle 15 at their locations spaced from the base 13 to limit movement of the handle away from the frame 14 of the truck.

Spring attaching elements in the form of eye bolts 30 and 31 extend through the base 13 at respectively opposite sides of the mid length location of the base and extend from the edge of the base at the side of the frame 14 remote from the handle 15. Tension springs 32 and 33 are connected each at one end to the eye bolts 30 and 31 respectively and are connected at their other ends to the legs of the handle 15 at locations spaced from the base. In the arrangement illustrated the springs 32 and 33 are connected to the legs of the handle by eye bolts 34 and 35 respectively which extend through the legs of the handle and also secure the corresponding ends of the chains 28 and 29 to the handle.

The springs 32 and 33 are effective to resiliently hold the handle 15 against the adjacent side of the frame 14 when the truck is in its folded condition, as is illustrated in Figure 4 and to resiliently hold the handle spaced from the frame the length of the chains 28 and 29 when the truck is in its unfolded or operative condition, as illustrated in Figure 1.

Figure 2:
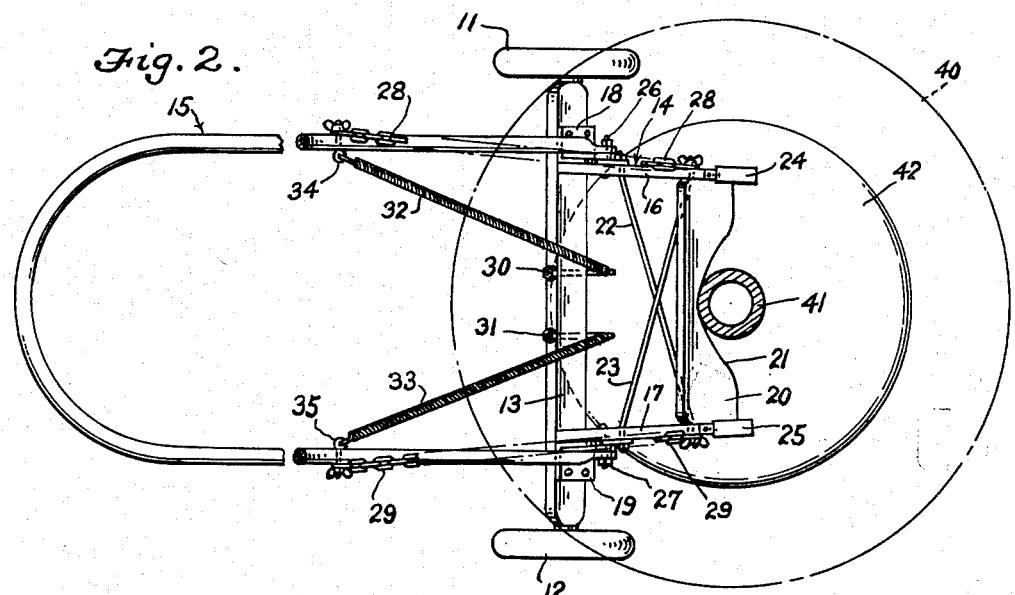
Figure 2 is a cross sectional view on the line 2—2 of Figure 1.

The table illustrated in Figures 1 and 2 has a flat top 40 which, in some cases, is of circular shape, a pedestal 41 of cylindrical shape secured at its upper end to the top 14 at the center of the under side of the table top and a heavy base 42, usually of circular shape, secured at its center to the lower end of the pedestal 41.

In using the truck to lift a table of this type, with the truck in its unfolded or operative condition, the frame 14 is moved under the table and the upper ends of the bars 16 and 17 are brought into engagement with the under surface of the table top one at each side of the pedestal 41 and with the pedestal 41 received in the notch 21 of the cross member 20. The bars 16 and 17 are of such a length that they are inclined upwardly toward the pedestal 41 when the upper ends of the bars engage the under surface of the table top and the wheels 11 and 12 rest on the floor at the respectively opposite sides of the base 42 of the table. Downward pressure on the outer end of the handle 15 will now raise the table slightly above the floor and support the table on the truck. With the table so supported the truck and table can be moved from one location to another.

In order to use the truck to move tables of the type illustrated in Figures 6 and 7 wherein the table has a square or rectangular top 45 and four legs, as indicated at 46a, 46b, 46c and 46d extending one from each corner of the top, it is necessary to provide a truck pilot or stop on the under side of the table top. This pilot or guide comprises a rectangular plate 47 having apertures disposed one adjacent each corner thereof secured to the table top centrally on the under surface of the latter by screws 48 extending one through each aperture in the plate and threaded into the table top, and a cylindrical body 49 projecting from the plate 47 centrally of the latter in a direction away from the associated table top 45.

With this arrangement, the frame of the truck is moved under the table in the manner indicated above, and the upper ends of the bars 16 and 17 are brought to bear against the under surface of the table top one at each side of the body 49 with this body received in the notch 21 in the cross member 20, the bars being inclined upwardly in a direction toward the body 49 or away from the handle 15 at this time. Downward pressure on the handle will now raise the table and support it on the truck so that the table and truck can be moved without any of the table legs dragging on the floor during the movement of the table.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand truck for lifting and moving tables comprising an axle, wheels journaled on said axle one at each end thereof, a flat base mounted on said axle and extending longitudinally thereof between said wheels, bars secured each at one end to said base at spaced apart locations along the latter and extending substantially perpendicularly from said base in spaced apart and substantially parallel relationship to each other, said bars converging slightly in a direction away from said base, a cross member extending between and secured at its ends to said bars adjacent the ends of the latter remote from said base, said cross member being of elongated rectangular cross sectional shape with its wider surfaces disposed substantially perpendicular to the longitudinal center lines of said bars and having a curved notch in one edge thereof, braces connected between said bars in the space between said base and said cross member, a U-shaped handle having its ends pivotally connected one to each of said bars adjacent said base and disposed at the side of said bars and said cross member remote from the notch in the latter, flexible members connected one between each of said bars and said handle at locations spaced from said base, a spring attaching element secured to said base and projecting laterally therefrom at the side of said bars remote from said handle, and a tension spring connected between said spring attaching element and said handle resiliently holding said handle against said bars in the folded condition and spaced from said bars the length of said flexible members in the operative condition of the truck, said bars being adapted to engage the under surface of a table top at their ends remote from said base and the notch in said cross member being adapted to receive a table pedestal to properly position a table on said bars for movement by the truck.

2. A hand truck for moving tables comprising an axle, wheels mounted on said axle one at each end thereof, a frame of generally rectangular shape mounted at one end on said axle and adapted to engage at its other end under a table top, a handle pivotally connected at one end to said frame at a location adjacent said axle, and a flexible member connected between said frame and said handle at locations spaced from said axle, said frame including a base secured to and extending along said axle, bars secured each at one end to said base at spaced apart locations along the latter and a cross member extending between and secured to said bars at locations spaced from the other ends of said bars, said cross member having a recess intermediate the length thereof adapted to receive a table pedestal and said bars being engageable at said other ends thereof under an associated table top, and said handle comprising a U-shaped structure having its ends pivotally connected one to each of said bars.

References Cited in the file of this patent

UNITED STATES PATENTS

| Number | Name | Date |
|---|---|---|
| 1,802,809 | Funk | Apr. 28, 1931 |
| 2,243,915 | Mueller | June 3, 1941 |
| 2,453,246 | Moksnes | Nov. 9, 1948 |
| 2,507,234 | Vickery | May 9, 1950 |

FOREIGN PATENTS

| Number | Country | Date |
|---|---|---|
| 185,067 | Great Britain | Aug. 31, 1922 |
| 842,374 | France | Mar. 6, 1939 |
| 74,830 | Norway | Mar. 21, 1949 |